March 31, 1942.    P. S. HARPER    2,277,757
FITTING FOR GAS BURNERS
Filed May 8, 1939
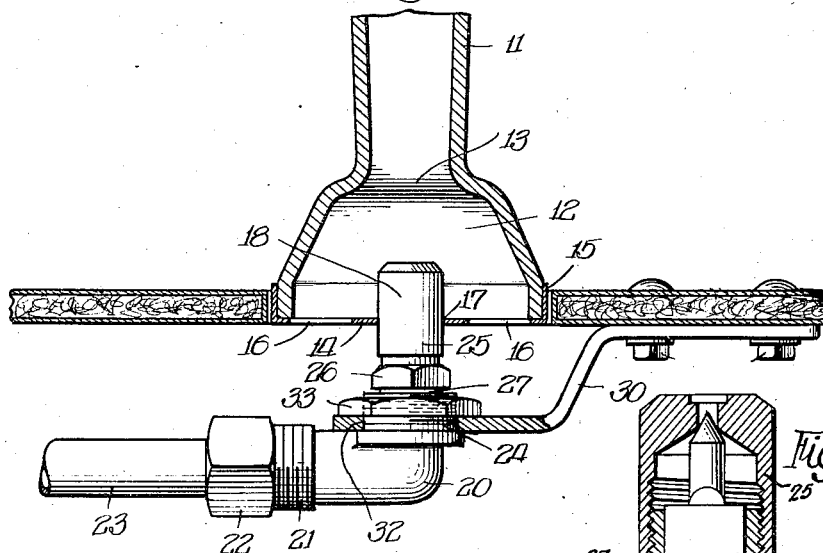
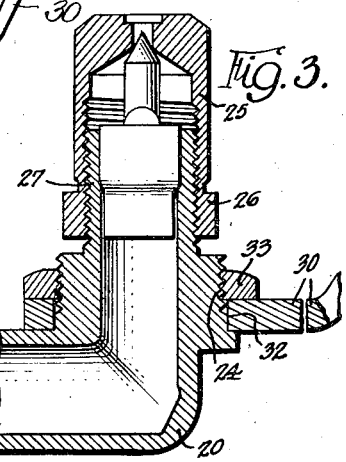
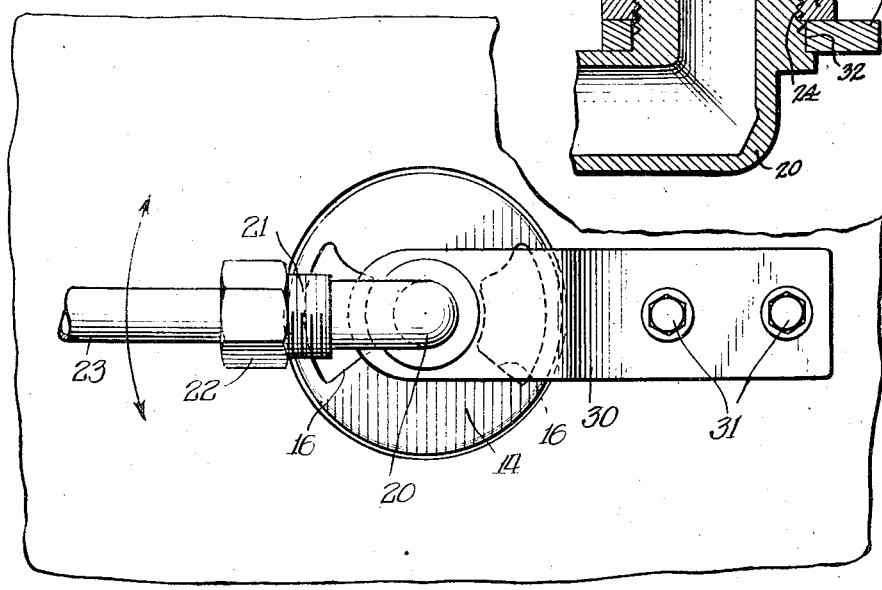
INVENTOR.
Philip S. Harper,
BY
ATTORNEYS.

Patented Mar. 31, 1942

2,277,757

UNITED STATES PATENT OFFICE 2,277,757

FITTING FOR GAS BURNERS

Philip S. Harper, Chicago, Ill., assignor to Harper-Wyman Company, a corporation of Illinois Application May 8, 1939, Serial No. 272,332

1 Claim. (Cl. 158—118)

This invention relates to improved fittings for gas burners, and more particularly to an assembly comprising an orifice fitting, a Venturi throat of an oven gas burner, and a novel bracket for holding these parts in assembled relation in a manner hereinafter more fully set forth.

It is an object of this invention to provide a novel fitting assembly of the type described, which will assure at all times a more accurate alignment between the opening of the orifice fitting and the axis of the Venturi throat of the gas burner.

A further object of this invention is to provide an assembly of the character described, in which the orifice fitting is held at a point closer to the orifice fitting outlet whereby any slight displacement of the holding bracket will result in a minimum displacement of the alignment of the orifice fitting outlet.

A further object of this invention is to provide an assembly of the character described, in which the orifice fitting is held by a bracket in such manner that the orifice fitting may be mounted in any one of a plurality of adjusted positions, whereby the gas line connected to the orifice fitting may approach from any desired angle.

A further object of this invention is to provide an assembly of the character described, comprising an orifice fitting and a holding bracket therefor of novel construction which permits the orifice fitting to be secured to and removed from the bracket without first removing any portion of the orifice fitting itself.

A further object of this invention is to provide an orifice fitting of the character described, which is simple in construction and inexpensive to make and install, and yet at the same time provides for ease in assembly and more positively assures accurate alignment between the axis of the orifice fitting and the axis of the Venturi throat of the oven burner.

These and other objects not specifically enumerated are contemplated for this invention, as will be apparent to one skilled in the art as the following description proceeds.

One specific example of this invention is illustrated in the accompanying drawing, reference to which will assist in the understanding of the following detailed description thereof.

In the drawing—

Figure 1 is a fragmentary plan view, partly in cross section, illustrating the assembly of this invention and showing its relationship to a portion of a wall of the oven of a gas stove;

Figure 2 is an elevational view of the assembly shown in Figure 1; and

Figure 3 is a sectional view of the fitting illustrated in Figures 1 and 2.

As illustrated, this invention comprises a Venturi throat 11 of an oven burner, only the end of which is here shown. It is to be understood, however, that the Venturi throat may be of any suitable design and is to be connected to an oven burner which may be of usual construction and which may be mounted in the oven in accordance with usual practice. As is customary, the Venturi throat has an enlarged bell-shaped end portion 12, and further has a restricted Venturi portion 13. The outer end of the bell portion 12 is preferably partially closed by a cap member 14 having a flange 15 extending over the end of the bell. This cap member is also provided with air inlet openings 16 of any suitable number and design. The cap member 14 is provided with a central opening 17 of a size to accommodate the orifice fitting 18 substantially in the manner shown in Figure 1. The usual clearance is provided between the edges of the cap member 14 at the opening 17 and the outside surface of the orifice fitting 18.

The Venturi throat of the gas burner may be formed as an integral part of the burner proper and is mounted in the oven by means of the supports provided for the burner. As such mountings are conventional in this art and do not, per se, constitute any part of this invention, they are not here illustrated or described in detail. But, as is well known, it is usual to provide shelf-like brackets extending into the oven space from the side walls of the oven, in which holes are provided which receive small projecting lugs formed on the bottom of the burner or on flanges carried by the burner. Thus, the burner may be placed in the oven and laid on top of the shelf supports with the lugs or projections, which extend from the bottom thereof, placed in the holes of the brackets. In this way, the oven burner is removably mounted in the lower portion of the oven in such manner that it is securely held against accidental displacement, but at the same time it is capable of being lifted bodily from the oven by a movement which will free the lugs and at the same time permit the Venturi throat to be withdrawn from the orifice fitting.

With this type of mounting of the oven burner, it will be apparent that the location of the Venturi throat will be determined by the brackets which support the oven burner and that when once positioned, the Venturi throat cannot be moved or otherwise adjusted to assist in aligning the axis of the Venturi throat with the axis of the orifice fitting. It is, therefore, apparent that the orifice fitting must be mounted by other and independent means so that it will be held in the desired axial alignment with the Venturi throat.

At the present time, it is common practice to mount the orifice fitting on the end of the gas feed pipe which extends to the location of the Venturi throat from some remote point, usually from the upper front portion of the stove where the gas control valves are located, and to depend upon the gas pipe itself as the sole means for mounting and positioning the orifice fitting with respect to the Venturi throat. With such constructions, it is very difficult to accurately align the orifice fitting with respect to the axis of the Venturi throat, with the result that the gas is not fed accurately into the axial center of the Venturi throat and improper combustion results. In certain instances, brackets have been formed as integral parts of the orifice fitting, which brackets are adapted to be secured to the adjacent oven wall, but in such instances unintentional misalignment of the bracket has resulted in a large displacement of the alignment of the orifice fitting with respect to the Venturi opening, due to the particular bracket constructions employed.

Furthermore, such brackets have been either integral with or fixed with respect to the orifice fitting, with the result that in use such fittings have been capable of only one type of installation, that is, they have been suitable for use with the gas feeding pipe approaching only from one predetermined direction. Whereas this objection may not be important in so far as the particular design of stove for which it is made, is concerned, such brackets and fittings are not suitable for use on different models and types of stoves in which the gas feeding pipes approach the orifice fitting from different directions.

According to this invention, the orifice fitting comprises an angle member 20 terminating in a threaded portion 21 having a connecting nut 22 whereby the fitting is connected to the gas pipe 23 in substantially the manner shown. On the shank of the fitting proper is an enlarged threaded hub 24 which has a diameter greater than the maximum diameter of the hood member 25 of the orifice fitting. The outlet portion of the orifice fitting may be of usual construction comprising a cylindrical body portion and having a straight-sided, nut-like base 26 adapted to receive a tool so that it may be threaded onto the angle member 20 by means of internal threads engaging the threaded shank 27 of the angle member.

The orifice fitting as a whole is adapted to be mounted with respect to the Venturi throat by means of a bracket 30 which may be of any desired shape but which, in this instance, is shown as a Z-shaped bar secured to the oven wall by means of bolts 31 or any other suitable attaching means, such as rivets, welding, or otherwise.

The bracket illustrated is attached only at one side, but it is contemplated that the bracket may be of modified U-construction or other suitable shape, so as to have two or more supporting legs for attachment to the oven wall. The bracket is provided with an opening 32 adapted to receive the threaded shank 24 of the angle member, and is attached in clamped relation thereto by means of the holding nut 33. It is to be noted that the holding nut is adapted to fit on the threaded shank 24, and that due to the fact that the diameter of the shank is greater than the maximum diameter of any part of the outlet member of the orifice fitting, the nut may be slipped thereover without removing any part of the fitting proper. This construction permits the orifice fitting to be assembled and properly adjusted for any desired installation and thereafter clamped to the bracket by merely inserting the fitting through the hole in the bracket and then applying the holding nut.

It will be apparent from the nature of the construction that the holding nut may be disposed outwardly from the wall of the oven so as to be readily accessible for receiving a tool whereby it may be tightly clamped by a simple and convenient installing operation. It will further be apparent that the bracket can be secured to the oven wall by an independent operation prior to the time the orifice fitting is secured to the bracket, and during such operation the opening in the bracket can be disposed as nearly as possible in arcuate alignment with the axis of the Venturi throat, which is presented in the opening provided in the oven wall.

It is also apparent that during the installation of the orifice fitting, the angle member 20 may be rotated in the opening of the bracket by virtue of the fact that the axis of the opening coincides with the axis of the gas outlet of the orifice fitting. Thus, the angle member may be adjusted to any desired angular position with respect to the position shown in Figure 2, as indicated by the arrows, whereby the threaded portion 21 for receiving the gas pipe 23 may be disposed in any desired position for connection to the gas pipe which is accordinly free to approach the fitting from any desired direction. By providing free angular movement of the orifice fitting for accommodating the fitting to a proper connection with the gas pipe, all strain on the fitting that would otherwise be caused by effecting the gas pipe connection is entirely avoided.

Furthermore, the connection on the hub 24 of the bracket is much closer to the outlet end of the orifice fitting than is the case with other types of fittings, whereby any slight unintentional misalignment of the bracket will not cause an appreciable displacement of the outlet opening. This is because the holding hub 24 is sufficiently close to the outlet opening to avoid any appreciable multiplication of error, as would be the case if the orifice fitting were held at a point distantly removed from the outlet opening. Furthermore, it will be apparent that the assembly of this invention is well adapted to various types and makes of stoves, for the reason that the holding bracket can be placed in any desired manner, provided the opening is in alignment with the Venturi throat of the oven burner and that thereafter the fittings may be suitably secured to the bracket by a very simple and inexpensive operation, and the parts suitably moved and adjusted to accommodate the connection to the gas pipe from any desired angle of approach.

This invention is not to be limited to the particular form of the invention disclosed in the drawing and hereinabove described as this form is merely illustrative, but the invention is to be given the broadest possible scope permitted by the prior art and as determined by the appended claim.

What is claimed is:

The combination of a support having an opening therethrough and a gas feeding orifice fitting adapted to have its outlet end inserted through said support opening and to be held by said support in gas feeding relationship to a burner, said orifice fitting having a body portion provided at one end with means for connecting the same to a gas pipe and further having a flange provided with a surface facing the outlet end of said orifice fitting and of greater dimension than the opening in said support, and being adapted to contact and embrace one side of said support when said orifice fitting is mounted therein, a hub on said body portion adjacent said flange and on the outlet side thereof being adapted to extend through the opening in said support, and holding means cooperating with said hub and being adapted to engage said support and clamp the same against said flange, the outlet end of said orifice fitting being disposed beyond said hub and comprising an extension and a cooperating outlet member mounted for rotative adjustment on said extension to provide a proper gas feeding action, said outlet member having an overall dimension less than the internal dimension of said holding means whereby said holding means may be removed from said hub and withdrawn over the outlet end of said fitting and the fitting thereby freed for removal from said support without disturbing the adjustment of said outlet member.

PHILIP S. HARPER.